UNITED STATES PATENT OFFICE.

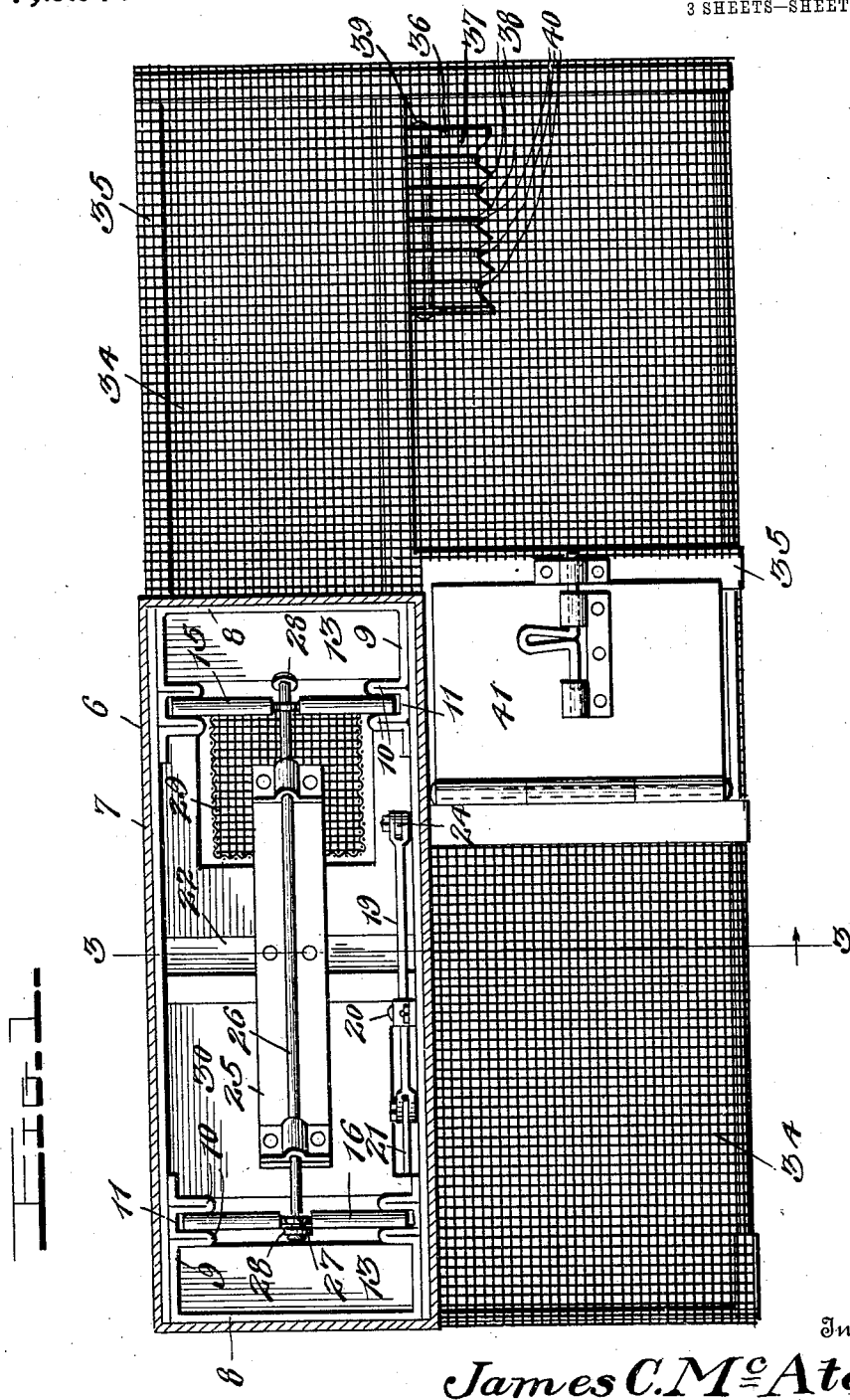

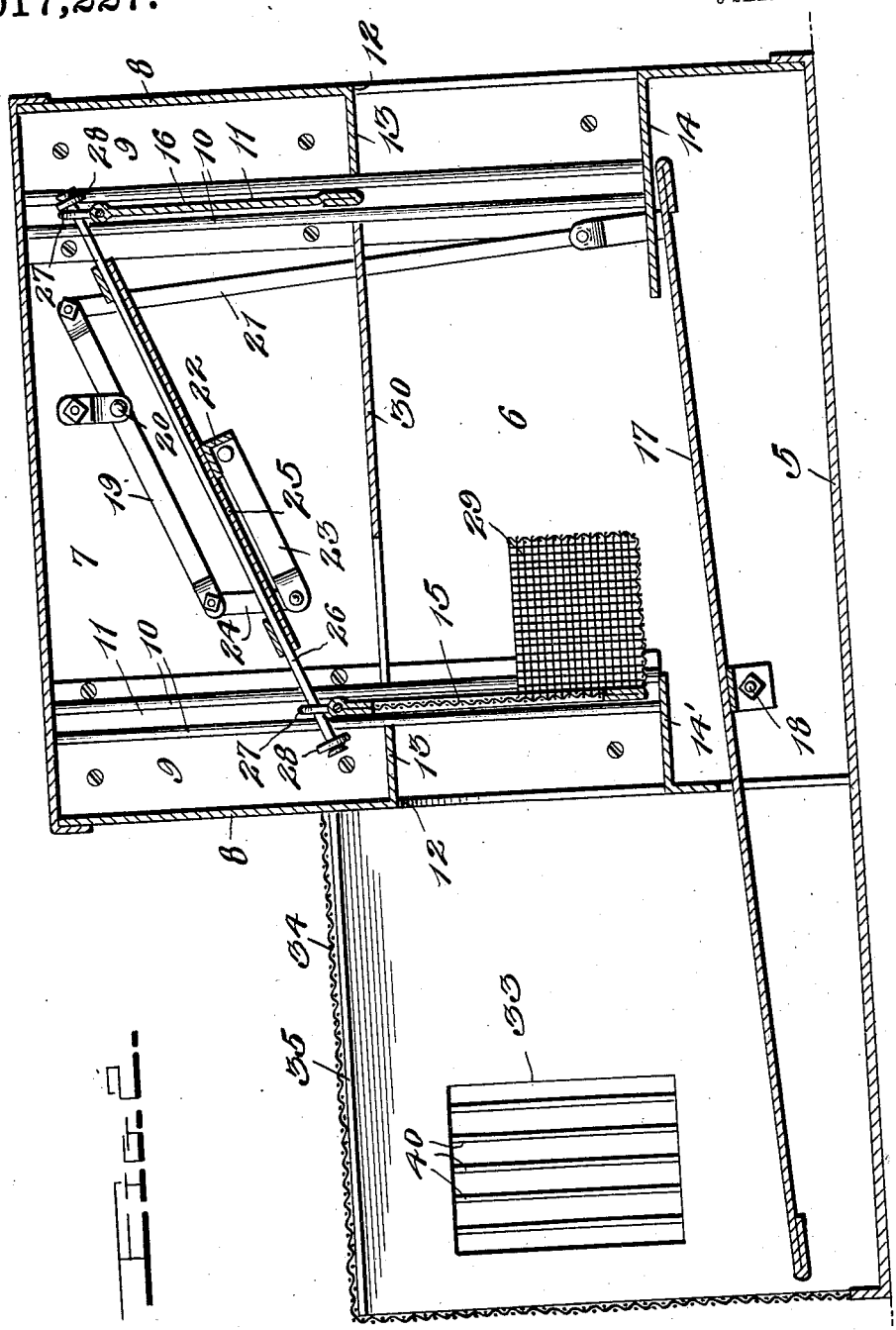

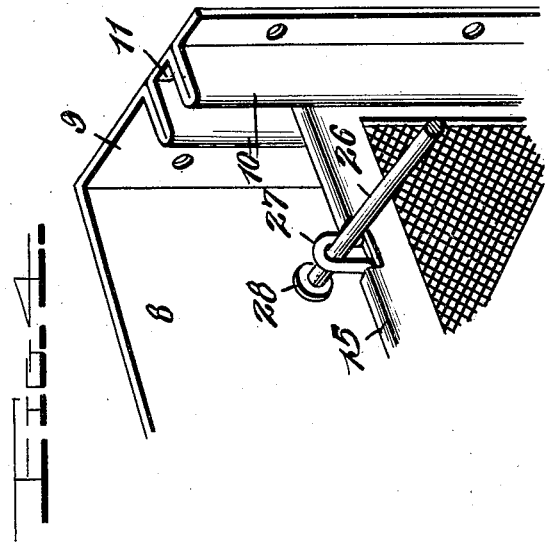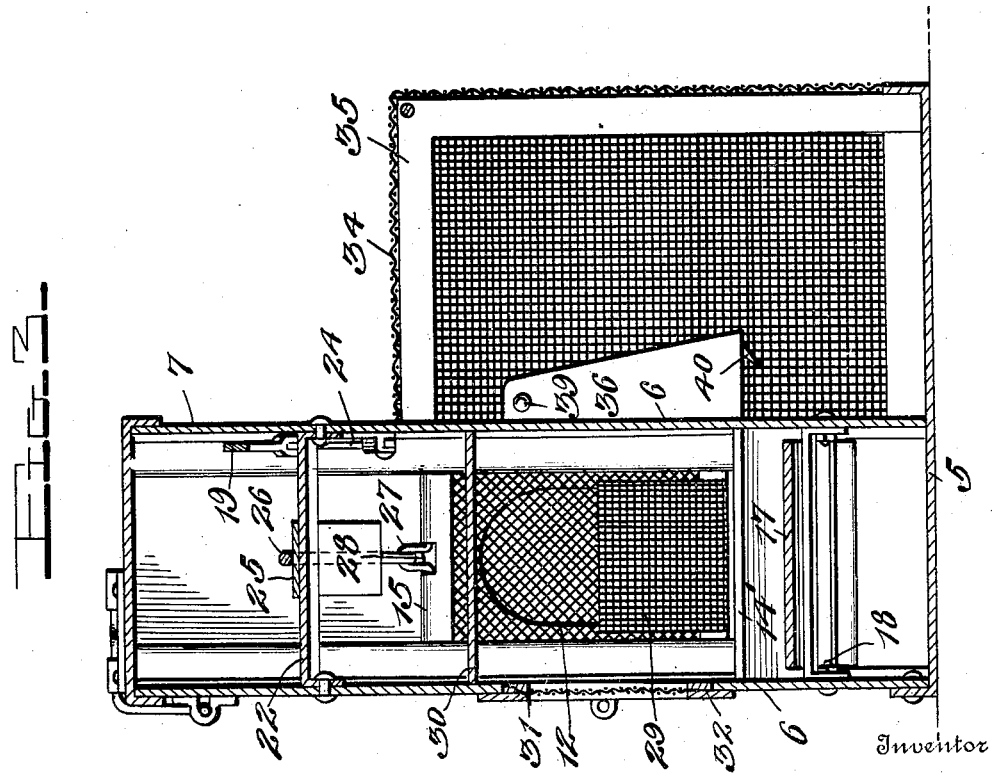

JAMES C. McATEE, OF HIWASSE, ARKANSAS.

ANIMAL-TRAP.

1,017,227.  Specification of Letters Patent.  Patented Feb. 13, 1912.

Application filed October 9, 1911. Serial No. 653,556.

*To all whom it may concern:*

Be it known that I, JAMES C. McATEE, a citizen of the United States, residing at Hiwasse, in the county of Benton and State of Arkansas, have invented certain new and useful Improvements in Animal-Traps, of which the following is a specification, reference being had to the accompanying drawings.

This invention relates to animal traps and more particularly to a trap of the victim set type of that character shown and described in my prior patent, #997,841 issued July 11th, 1911.

The present invention has for its primary object to improve and increase the efficiency and ease of operation of a trap embodying the broad features of construction disclosed in the aforementioned patent.

Another and more particular object of the invention is to provide improved means for mounting the vertically sliding doors through which the animal enters the trap.

A further object resides in the provision of a bait receiving receptacle carried by one of the doors, whereby the bait is disposed out of the reach of the animal after it has entered the trap.

With the above and other objects in view, the invention consists of the novel features of construction, combination and arrangement of parts hereinafter fully described and claimed, and illustrated in the accompanying drawings, in which—

Figure 1 is a top plan view of a trap embodying my improvements; Fig. 2 is a vertical longitudinal section thereof. Fig. 3 is a vertical transverse section taken on the line 3—3 of Fig. 1; and Fig. 4 is a detail fragmentary perspective view on an enlarged scale illustrating the mounting of the sliding doors.

Referring in detail to the drawings 5 designates the base of the trap upon which the parallel longitudinal walls 6 are erected and rigidly secured by bolting or riveting the same to the base plate. One of these side walls is erected upon the edge of the base, and the other is disposed midway between the longitudinal edges thereof. One end of each of the walls 6 of the trap body is formed with the vertical extension 7 which is substantially one-half of the length of said wall. Between the longitudinal walls 6 and extending from the base 5 to the upper edges of the extension 7 of said walls, the end walls 8 are arranged. These latter walls at their vertical edges are bent at right angles and extended inwardly between the side walls 6 as indicated at 9 and these extensions of the end walls are bent to provide spaced longitudinally extending ribs 10 which are of U-shaped form in cross section and provide between them the longitudinal channel 11. The longitudinally extending portions 9 of the end walls are riveted or otherwise rigidly fixed to the walls 6 and the extensions thereof. The end walls 8 at their lower ends are provided with vertical openings 12 and plates 13 are arranged at the upper ends of said openings between said end walls and the ribs 10 which are formed on the end portions thereof. The lower ends of the U-shaped vertical ribs or flanges 10 terminate at the lower edges of the openings 12 in the end walls and a plate 14 extends inwardly from the lower edge of one of said openings and projects to some extent beyond the lower ends of said ribs. A similar plate 14' is also secured to the other of the end walls at the lower edge of the opening 12 therein and extends laterally to the ribs 10 and projects beneath the same to provide a stop for one of the vertically sliding doors to be later described.

The opening 12 in the intermediate vertical wall 8 is adapted to be closed by means of the door 15 which is preferably formed of wire netting while the opening in the other vertical wall 8 is closed by means of the solid metal door 16. These doors are vertically movable between the side walls 6 and their movement is effected by the entrance of the animal into the trap in the following manner.

A platform 17 is pivotally mounted between the side walls 6 and below the openings 12 of the walls 8, the pivots 18 for said platform being centrally secured to the under side thereof and mounted in suitable bearings arranged on the side walls. Upon the vertical extensions 7 of the inner side walls 6 and at a point adjacent to its upper edge a lever 19 is pivotally mounted as indicated at 20. To one end of this lever a rod 21 is pivotally connected, and the lower end of said rod is connected to one end of the pivoted platform 17. A transversely disposed angle bar 22 has trunnions formed on its ends which are rotatably mounted in the side walls 6 and to one end of this angle bar a laterally extending arm 23 is rigidly fixed, A link 24 connects this arm to the other end of the lever 19. A longitudinally extending plate 25 is rigidly fixed upon the central portion of the transverse angle bar 22 and upon this plate a longitudinal rod 26 is arranged and rigidly fixed, the ends of said rod extending a considerable distance beyond the ends of the plate. By thus mounting the rod 26 and providing the angle bar 22 which is mounted in the side walls for rocking movement, a very strong and substantial structure is obtained and the parts thereof will not be bent or distorted under the weight of the animal upon the platform 17. To the upper edges of the doors 15 and 16 and centrally thereof the loops 27 are secured and through these loops the ends of the rod 26 are loosely disposed. The ends of the rod 26 are provided with the heads or stop flanges 28. A bait basket or receptacle 29 is carried by the door 15 and is arranged upon the lower portion thereof. A horizontal wall 30 is rigidly secured to the side walls 6 at a point immediately above the opening 31 in the outer side wall through which access may be obtained to the interior of the trap for baiting the same. This opening 31 is closed by means of a suitable door 32. The horizontal wall 30 will effectually prevent the animal from reaching the bait basket or receptacle and destroying the same.

As thus far described, the operation of the trap is substantially as follows. The animal enters the trap through the opening 12 in the end wall 8, the door 16 being elevated. After crossing the inwardly projecting plate 14, the animal treads upon the pivoted platform 17 whereupon the door 16 is drawn downwardly in the guide channels 11 through the medium of the rod 21 and the connections between the same and the angle bar 22 whereby said bar is rocked between the side walls. Simultaneously with the lowering of the door 16 the other of the doors 15 carrying the bait basket is raised until it is disposed above the horizontal wall or plate 30 which is provided with an opening in one end for the reception of the bait basket. The animal now passes through the opening 12 in the other of the walls 8 and steps upon the platform on the opposite side of its pivot whereupon the door 16 is elevated and the door 15 lowered to its closed position so that the trap is again set. The engagement of the end of the platform 17 with the under side of the inwardly projecting plate 14 limits the pivotal movement of said platform. The door 15 is limited in its downward movement by engaging at its lower end with the edge of the plate 14'. In this sliding movement of the doors 15 and 16, the ends of the rod 26 move freely through the U-shaped links 27 which are secured to the upper edges of said doors.

After the animal has moved into the trap beyond the door 15 as above described, it passes through an opening 33 in the inner side wall 6. Beyond the intermediate vertical wall 8, the upper edges of the walls 6 are connected by the wire netting 34. This netting is also secured upon an angle bar frame 35 which is arranged upon the base and is secured to the same and to the central longitudinal wall 6. The opening 33 in the end of this wall is provided with vertical flanges 36 at its opposite edges and a lower horizontal flange 37, the latter being notched or provided with the saw teeth 38. A rod 39 is fixed at its ends in the upper ends of the flanges 37 and upon said rod a plurality of restraining bars 40 are loosely mounted. The free ends of these bars are bent or hooked and disposed between the teeth on the flange plate 37. The bars 40 have free outward swinging movement so as to admit of the animal pushing the same outwardly whereby it may enter the unobstructed longitudinal compartment of the trap which is covered with the wire netting. A door 41 is provided in the top of this compartment so that the animal may be readily removed. It will thus be seen that after the animal has been caught in the trap and enters this side compartment, it is impossible for him to again return to that part of the trap in which the platform 17 is arranged.

From the foregoing it is thought that the construction and manner of operation of my improved trap will be obvious. The many improvements which I have devised in the construction of the body of the trap materially adds to the quickness and ease of its operation. Owing to the fact that the animal is unable to reach the bait which is used to entice him into the trap, the trap is rendered very sanitary as no particles of decayed meat can find their way beneath the pivoted platform 17 from which point they could not be removed without entirely dismantling the trap. The trap may be made in a great many different sizes and is well adapted to the trapping of rats, rabbits or other animals of even larger size. It will also be understood that the trap may be constructed from sheet metal, wire netting or any other desired material which may be found serviceable.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. A victim set trap, comprising a cage consisting of a base, parallel longitudinal side walls and end walls connecting said side walls, a horizontal plate connecting the side walls and arranged in spaced relation to the base and provided with an opening, said end walls being provided with openings, vertical guides on the side walls, doors movable in said guides to open and close the openings in the end walls, a bait basket carried by one of said doors, a compartment arranged upon the base, the opening in one of the end walls affording communication to said compartment, a tilting platform mounted between the side walls and having its pivot located between said end walls, said platform extending into said compartment, and means mounted between the side walls and connected to one end of said platform and to said doors to slide the doors in opposite directions by the weight of the animal on one end of the platform whereby the bait basket is moved through the opening in said horizontal plate and disposed above the same and communication is afforded between the interior of the trap and said exterior compartment.

2. A victim set trap comprising a cage having a body portion consisting of a base, parallel longitudinal side walls arranged upon said base and having vertical extensions on one of their ends, transverse walls connecting the side walls and extending longitudinally upon their inner faces, guides formed in the extensions of the transverse walls, said walls having openings in their lower ends, a tilting platform pivotally mounted intermediate of its ends in said side walls and beneath said openings, doors vertically movable in said guides in reverse directions to alternately open and close said openings, a bait receptacle carried by one of said doors, a horizontal plate arranged between the side walls and provided with an opening to receive said receptacle above which the same is disposed when the door is in its elevated position, a transverse angle bar journaled in the side walls, a longitudinally extending rod fixed upon said angle bar, loops secured to the upper edges of the doors, the ends of said rod being slidably disposed in the loops, and means connected to the tilting platform and to said angle bar to rotate said bar and slide the doors under the weight of the animal upon said platform.

In testimony whereof I hereunto affix my signature in the presence of two witnesses.

JAMES C. McATEE.

Witnesses:
HOMER NICHOLS,
MAUD ADCOCK.

---

Copies of this patent may be obtained for five cents each, by addressing the "Commissioner of Patents, Washington, D. C."